United States Patent
Higley et al.

(10) Patent No.: US 9,047,922 B2
(45) Date of Patent: Jun. 2, 2015

(54) AUTONOMOUS EVENT LOGGING FOR DRIVE FAILURE ANALYSIS

(75) Inventors: Brian John Higley, Longmont, CO (US); Bradley John Gill, Longmont, CO (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 151 days.

(21) Appl. No.: 13/360,073

(22) Filed: Jan. 27, 2012

(65) Prior Publication Data
US 2013/0198574 A1    Aug. 1, 2013

(51) Int. Cl.
*G06F 11/00* (2006.01)
*G11B 27/36* (2006.01)
*G06F 11/07* (2006.01)
*G06F 11/34* (2006.01)
*G06F 11/30* (2006.01)

(52) U.S. Cl.
CPC ............ *G11B 27/36* (2013.01); *G06F 11/3476* (2013.01); *G06F 11/3058* (2013.01); *G06F 2201/81* (2013.01); *G06F 2201/86* (2013.01); *G06F 11/0727* (2013.01); *G06F 11/0766* (2013.01); *G11B 2220/63* (2013.01)

(58) Field of Classification Search
CPC ........................... G06F 11/0793; G06F 11/327
USPC ..................... 714/48, 25, 57, 42, 45
See application file for complete search history.

(56) References Cited

U.S. PATENT DOCUMENTS

| | | |
|---|---|---|
| 7,451,355 B1 | 11/2008 | Coatney et al. |
| 2002/0036850 A1 | 3/2002 | Lenny et al. |
| 2002/0060868 A1 | 5/2002 | Lenny et al. |
| 2005/0246590 A1* | 11/2005 | Lancaster ........................ 714/47 |
| 2006/0005074 A1* | 1/2006 | Yanai et al. ........................ 714/5 |
| 2006/0277441 A1 | 12/2006 | Edgar et al. |
| 2007/0192654 A1* | 8/2007 | Lauterbach et al. ............ 714/36 |
| 2008/0091982 A1 | 4/2008 | Bartlett et al. |
| 2009/0094484 A1* | 4/2009 | Son et al. ......................... 714/26 |
| 2010/0017879 A1* | 1/2010 | Kuegler et al. .................. 726/23 |
| 2010/0251044 A1 | 9/2010 | Khatri et al. |
| 2012/0005542 A1* | 1/2012 | Petersen et al. ................. 714/48 |

* cited by examiner

*Primary Examiner* — Sarai Butler
(74) *Attorney, Agent, or Firm* — HalzerIPLaw, PC (57) ABSTRACT

A method and system for providing autonomous event logging and retrieval for failure analysis. In one implementation, storage device firmware monitors and records events (e.g., storage device errors and/or failures) to the storage device flash in substantially real time from power on of the storage device to power off. Additionally, diagnostic data relating to an event, including a time stamp and storage device environmental conditions are recorded. The logged event data may be utilized to streamline failure analysis by determining whether the storage device failed and if so, when the storage device failed and what the conditions of the storage device were at the time of the failure. Such information may be used for failure, warranty, integrator, and/or troubleshooting analysis.

19 Claims, 4 Drawing Sheets

AUTONOMOUS EVENT LOGGING FOR DRIVE FAILURE ANALYSIS

SUMMARY

Implementations described and claimed herein provide autonomous event logging and retrieval for failure analysis. In one implementation, storage device firmware monitors and records events (e.g., storage device errors and/or failures) to the storage device flash substantially in real time from power on of the storage device to power off. Additionally, diagnostic data relating to an event, including a time stamp and storage device environmental conditions, are recorded. The logged event data may be utilized to streamline failure analysis by determining whether the storage device failed, and if so, when the storage device failed and what the conditions of the storage device were at the time of the failure. Such information may be used for troubleshooting and/or warranty analysis.

These and various other features and advantages will be apparent from a reading of the following detailed description.

DETAILED DESCRIPTIONS

Customers return storage devices or submit storage devices for repair for a variety of reasons. Such storage devices may include, without limitation, hard disc drives (HDD), solid-state drives, optical drives, magnetic drives, and network attached drives. Additionally, such storage devices may be integrated into devices including, without limitation, cameras, DVR devices, multimedia consoles, and other devices having a primary and secondary storage. During repair, diagnostics information may be read from a returned storage device in an attempt to determine the cause of the customer's problem. However, reading diagnostics information captured by the storage device or examining the functionality of the storage device may provide little or no helpful information about what may have caused the customer's problem because diagnostics information relating to the problem may be missing.

Whether failure analysis of a storage device is effective and can be performed rapidly and accurately depends on the amount and quality of diagnostic data captured by the storage device. Failure analysis systems utilizing a disc or other media for recording event data may lose important data where an event occurs while the disc is unwritable. Missing data regarding events often leads to failure analysis conclusions that lack certainty or are not actionable. For example, the lack of effective failure analysis often results in either the storage device being categorized as "No Trouble Found" (NTF) or speculations as to the root cause of the failure of a storage device. An accurately identified failure root cause may be used to discern between storage device failures that are covered by warranty and storage device failures resulting from customer mishandling. Further, an accurately identified failure root cause may be utilized to solve quality issues relating to failed merchandise.

Many conventional failure analysis systems do not capture diagnostic data that identifies the root cause of the failure or do not distinguish between events caused by host or host interface errors as opposed to storage device errors. Further, many conventional failure analysis systems rely on a host to initiate the recording of event data, and as such, cannot record event data if the host interface fails. Accordingly, the presently disclosed technology provides autonomous (i.e., without a command from a host or interface) event logging to the storage device flash in real time from power on of the storage device to power off. Additionally, diagnostic data relating to an event, including a time stamp and storage device environmental conditions are recorded. Using the event log including the diagnostic data, it may be determined with a reasonable degree of certainty whether the storage device failed or not and what the root cause of any failure was.

Figure 1:
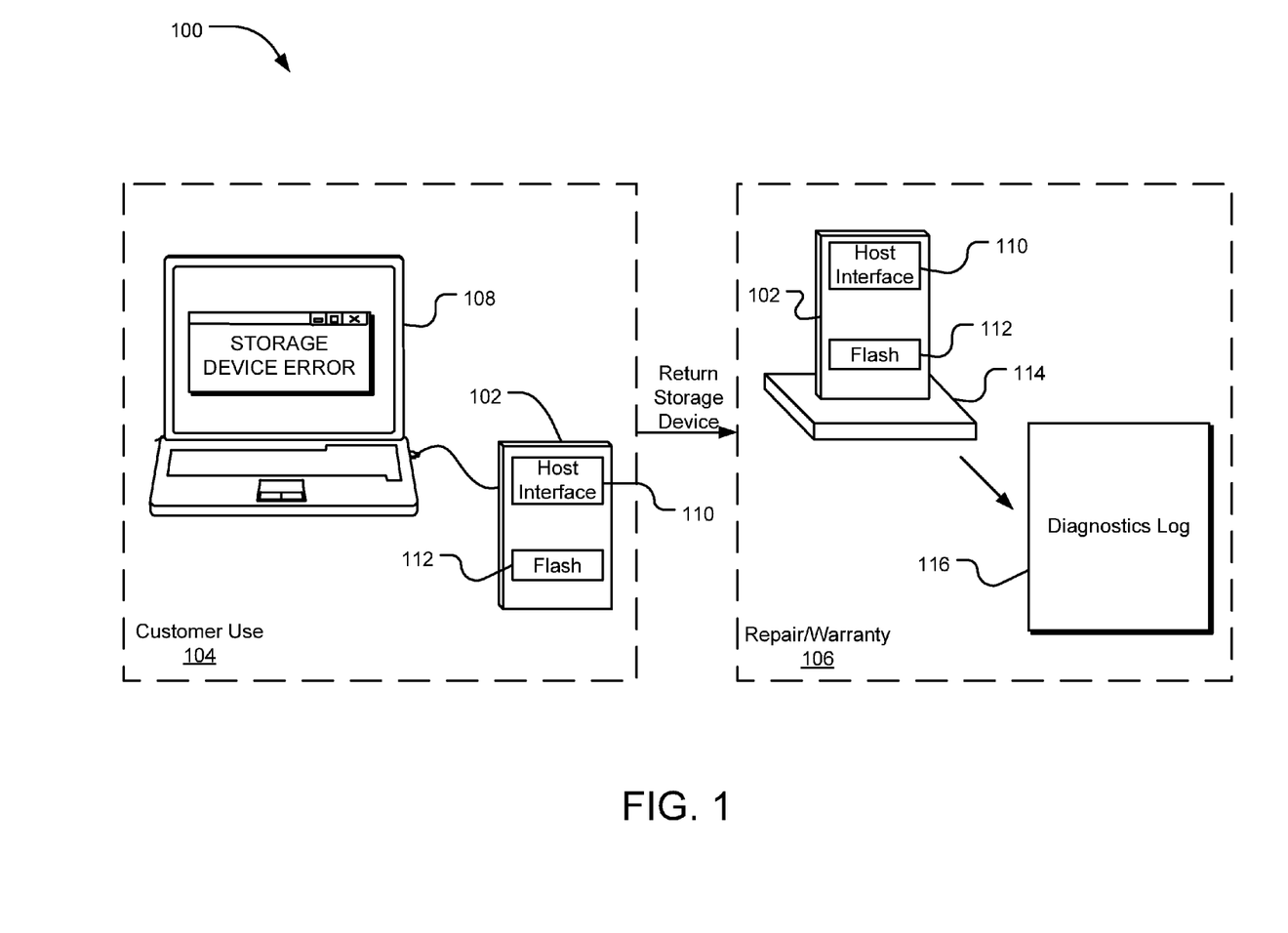
FIG. 1 illustrates an example storage device failure analysis system for identifying and providing repair and warranty feedback.

FIG. 1 illustrates an example storage device failure analysis system 100 for identifying and providing repair and warranty feedback. An implementation of the storage device failure analysis system 100 includes a storage device 102 shown in a customer use environment 104 and a repair/warranty environment 106.

In the customer use environment 104, the storage device 102 is connected a host 108. The host 108 may be implemented as various devices configured to communicate with the storage device 102, including without limitation a general purpose computer or special purpose computing device. The host 108 communicates with the storage device 102 via an interface 110.

From power on storage device 102 to power off, the storage device 102 self-monitors its environmental conditions and evaluates its performance. For example, the storage device 102 monitors environmental conditions including but not limited to power levels, temperatures, voltage, current, acceleration of the storage device media (e.g., a disc), and other parameters affecting the performance of the storage device 102. To evaluate its performance, the storage device 102 may compare the monitored environmental conditions to defined thresholds to determine whether the storage device 102 is operating within tolerance. Additionally, the storage device 102 is configured to self-detect other errors or performance anomalies, such as, for example, events causing a disruption or failure in the interface 110 protocol (fatal events), including but not limited to events that cause a host disruption (e.g., the storage device 102 losing connection with the host 108, failure of the storage device 102 to execute a command within a specified or allows time, failure of the storage device 102 to read and/or write data, failure of the media in the storage device 102 to spin up, failure of the storage device 102 to receive and execute commands within a specified or allowed time, etc.). The storage device 102 focuses the event monitoring and identification on events that correlate to system level failures of the storage device 102 as opposed to events such as retries, alts, etc. The storage device 102 further distinguishes between events resulting from the performance of the storage device 102 and events resulting from the performance of the host 108 and/or the interface 110. In one implementation, the storage device 102 analyzes the environmental conditions and performance anomalies to adjust the interaction between the host 108 and the storage device 102 to remedy any errors, where possible.

If the storage device 102 detects an event regarding the performance of the storage device 102 (i.e., a storage device detected event), the storage device 102 records the event and corresponding event-based diagnostic data to memory as the event occurs for failure analysis. In one implementation, the event-based diagnostic data recorded includes an error code, raw data, and a universal time stamp.

The error code includes data including an event group, which identifies the type of event, a failure code, which identifies the detected failures, and data indicating whether the event was fatal. For example, the event groups may include system interface events, process related events, servo related events, firmware or hardware related events, error recovery events, DST failure events, log failure events, DOS failure events, environmental or handling events, and firmware debug events. The failure codes may include, for example, excessive disc slip, voltage outside threshold, temperature outside threshold, disc spin up failure, excessive command completion time, etc.

The raw data includes additional data that is relevant to the event including without limitation measurements corresponding to the performance of the storage device 102 and measurements indicating customer mishandling of the storage device 102. Such measurements may include, for example, power level, temperature, voltage, current, acceleration of the storage device media (e.g., a disc), measured disc slip, and indications of water damage.

The error code and raw data are linked with the universal time stamp, which is the time of the event occurrence measured from the power on or boot of the storage device 102. In one implementation, where the storage device 102 has experienced a failure resulting in the media in the storage device 102 not being writable or a failure rendering the interface 110 inoperative, the time stamp is recorded as a blank placeholder. If such failures are subsequently remedied, the storage device 102 updates the placeholder time stamp with the actual time of the failure event. If such failures are not subsequently remedied, an approximate time of failure may be determined based on the time stamps of events previously recorded to the event log.

The event-based diagnostic data recorded may further include Logical Block Addressing (LBA), which specifies the location of data stored in the storage device 102 and one or more internal error codes, which include data specifying errors that occurred during event logging operations. For example, internal error codes may include, without limitation, invalid LBA, and invalid time stamp, and truncated raw data.

The event-based diagnostic data for each detected event is recorded to an event log in real time as an event entry. The storage device 102 records event entries autonomously (i.e., without a command from the host 108 or the interface 110). Accordingly, the storage device 102 is configured to identify event-based diagnostic data and record event entries even if the interface 110 is inoperative. The storage device 102 records event entries to memory, including but not limited to buffer, media (e.g., a disc) in the storage device 102, or flash 112 depending on the operational parameters of the storage device 102 and/or the nature of the event. For example, if the media is not writable, fails to spin up, or otherwise fails to function, the storage device 102 may write an event entry to the flash 112. Additionally, to ensure that data in the event log is not lost, the storage device 102 may record event entries to the flash 112 from power on of the storage device 102 to power off. In one implementation, event-based diagnostic data is temporarily stored in buffer in the storage device 102 upon detection of an event. After the storage device 102 analyzes the event-based diagnostic data and the operational parameters of the storage device 102, the event-based diagnostic data is recorded to the media or the flash 112.

In the example implementation, the host 108 displays a message notifying the customer that there is an error relating to the storage device 102. However, the storage device 102 may identify errors or failures that are not communicated to the host 108. If the customer is unable to identify the problem with the storage device 102, the customer may return the storage device, for example, to a store for repair, replacement, and/or warranty analysis.

In the repair/warranty environment 106, the storage device 102 is connected to a test fixture 114 for failure analysis. To retrieve the event log from the flash 112 or media in the storage device 102, the test fixture 114 may query the storage device 102 via the interface 110 or a serial port. The storage device 102, via the test fixture 114, outputs a diagnostics log 116 presenting the event log, for example, in a graphical user interface, a data readout, a data stream, or a print out. The diagnostic log 116 may include information from event entries stored in the flash 112, the media in the storage device 102, or a combination of both. In one implementation, the diagnostics log 116 is input into a computing device for automated failure analysis using an algorithm.

The diagnostics log 116 may be used for failure analysis to determine whether the storage device 102 failed, when the storage device 102 failed, what the root cause of the failure was, and what the customer experienced at the time of the failure. The failure analysis may be performed entirely from the diagnostics log 116. Accordingly, failure analysis may be performed without the storage device 102, and the root cause of any failure may be identified without recreating the problem the customer experienced.

In one implementation, during failure analysis, the storage device 102 interprets and parses the event entries in the event log into an event log summary. In another implementation, an external device interprets and parses the event entries in an event log summary. The event entries in the event log summary may be further organized according to the event groups for failure analysis. The event groups may have privacy, proprietary, or other restrictive viewing settings to allow only certain users to view data in an event group. The event log summary may be used to make the failure analysis more effective and efficient by focusing the failure analysis to a specific point in time that a particular failure (e.g., a failure causing the problem a customer experienced) occurred. For example, the universal timestamp, correlated to an event, directs an in-depth failure analysis with substantially more data (e.g., data collected for storage device logs or test systems) to a specific point in the data that relates to a particular failure. Additionally, the event log summary may be used to trigger further failure analysis for a particular failure based on the history logs of the storage device 102.

The diagnostics log 116 may be used for warranty analysis to determine if any failures of the storage device 102 are covered by a manufacturer or other warranty. The event-based diagnostic data recorded in an event entry includes information relevant to the cause of an event or failure, such as data regarding the environmental conditions of the storage device 102. The environmental conditions data in the diagnostics log 116 may be used to determine if customer mishandling of the storage device 102 is a factor of failure for warranty considerations. For example, if, at the time of the failure of which the customer complains, the power level, the temperature, the voltage, the current, and/or the acceleration of the media (e.g., a disc) in the storage device 102 were outside of tolerance levels, there may be indications of customer mishandling. Further, the storage device 102 may have sensors to detect events and record data indicating that the storage device 102 was dropped, subjected to abnormal force, or subjected to liquid intrusion. Additionally, the diagnostics log 116 may be used to determine the person or entity (e.g., manufacturer, shipping company, store, customer, etc.) having custody of the storage device 102 at the time of a particular failure. Accordingly, the diagnostics log 116 allows a manufacturer or store to determine, with a reasonable degree of certainty, whether a warranty applies to a storage device submitted for warranty repair or replacement.

The diagnostics log 116 may be used for an integrator analysis to provide instantaneous feedback regarding returned, repaired, and failed drives. In one implementation, the diagnostics log 116 is compared with diagnostics logs for similar storage devices to identify common reasons for returns and repairs and common root causes of failures. Such information regarding the quality of a version of storage device may be used to internally track any pervasive problems with a version and to determine possible improvements to subsequent versions.

Figure 2:
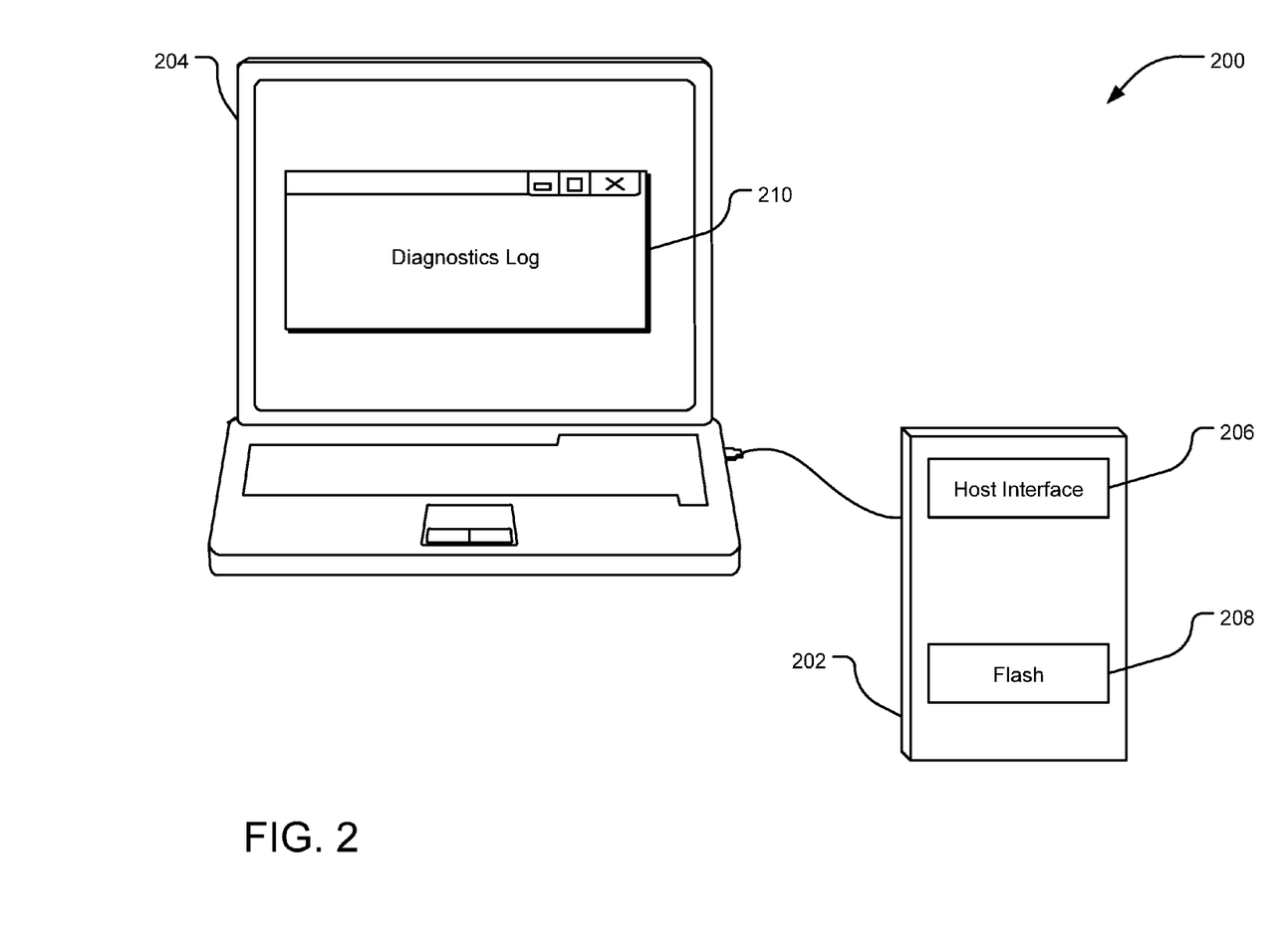
FIG. 2 illustrates an example drive failure analysis system for troubleshooting.

FIG. 2 illustrates an example drive failure analysis system 200 for troubleshooting. In one implementation, the storage device failure analysis system 200 includes a storage device 202 connected to a host 204. The host 204 may be implemented as various devices configured to communicate with the storage device 202, including without limitation a general purpose computer or special purpose computing device. The host 204 communicates with the storage device 202 via an interface 206.

From power on storage device 202 to power off, the storage device 202 self-monitors its environmental conditions and evaluates its performance. For example, the storage device 202 monitors communications and outstanding commands with the host 204 and environmental conditions including but not limited to power levels, temperatures, voltage, current, acceleration of the storage device media (e.g., a disc), and other parameters affecting the performance of the storage device 202. The storage device 202 distinguishes between events resulting from the performance of the storage device 202 and events resulting from the performance of the host 204 and/or the interface 206. In one implementation, the storage device 202 analyzes the environmental conditions and performance anomalies to adjust the interaction between the host 204 and the storage device 202 to remedy any errors, where possible.

If the storage device 202 detects an event regarding the performance of the storage device 202 (i.e., a storage device detected event), the storage device 202 records the event and corresponding diagnostic data as the event occurs for failure analysis. In one implementation, the event-based diagnostic data recorded includes an error code, raw data, a universal time stamp, and LBA, if applicable.

The event-based diagnostic data for each detected event is recorded to an event log in substantially real time as an event entry. The storage device 202 records event entries autonomously (i.e., without a command from the host 204 or the interface 206). Accordingly, the storage device 202 is configured to identify event-based diagnostic data and record event entries even if the interface 206 is inoperative. The storage device 202 records event entries to memory, including but not limited to buffer, media (e.g., disc) in the storage device 202, or flash 208 depending on the operational parameters of the storage device 202 and/or the nature of the event. For example, if the media is not writable, fails to spin up, or otherwise fails to function, the storage device 202 may write an event entry to the flash 208. Additionally, to ensure that data in the event log is not lost, the storage device 202 may record event entries to the flash 208 from power on of the storage device 202 to power off. In one implementation, event-based diagnostic data is temporarily stored in buffer in the storage device 202 upon detection of an event. After the storage device 202 analyzes the event-based diagnostic data and the operational parameters of the storage device 202, the event-based diagnostic data is recorded to the media or the flash 208.

In one implementation, the host 204 includes a support diagnostic program having instructions for performing an automated first level analysis in the field (e.g., at the customer/end user site). Performing failure analyses in the field reduces the amount of storage devices removed from end user systems in the field.

To retrieve the events log from the storage device 202, the host 204 issues a command, via the host interface 206 or a serial port. In response to the command, the storage device 202 outputs the events log, which the host 204 presents as a diagnostics log 210 on a graphical user interface. However, the diagnostics log 210 may be presented in other formats including but not limited to a data readout, a data stream, and a print out. The diagnostic log 210 may include information from event entries stored in the flash 208, the media in the storage device 202, or a combination of both. The diagnostics log 210 may be used for failure analysis to determine whether the storage device 202 failed, when the storage device 202 failed, and what the root cause of the failure was.

In one implementation, during failure analysis, the storage device 202 interprets and parses the event entries in the event log into a human readable event log summary, which may summarize the events recorded in the log and/or summarize the most recent failure corresponding to the problem the customer experienced. The event log summary is presented as the diagnostics log 210 and enables the customer to perform a troubleshooting analysis. Based on the troubleshooting analysis, the customer may correct problems where possible and determine whether the storage device 202 should be returned or repaired.

The storage device 202 may organize the event entries in the event log summary according to the event groups for a troubleshooting analysis. The event groups may have privacy, proprietary, or other restrictive viewing settings to allow only certain users to view data in an event group. Additionally, the diagnostics log 210 may be used to streamline further failure analysis. For example, the customer may send the diagnostics log 210 over the internet or otherwise transfer the diagnostics log 210 to a third party for further failure analysis, warranty analysis, integrator analysis, and/or other analysis. Such analyses may be performed without the storage device 202. Instead, an analysis may be performed entirely from the diagnostics log 210. Further, the diagnostics log 210 may be synchronized with external failure analysis data from an external device, such as the host 204. Such synchronized data allows a comparison of events, event-based diagnostic data, and timelines from the perspective of the storage device 202 and the external device.

Figure 3:
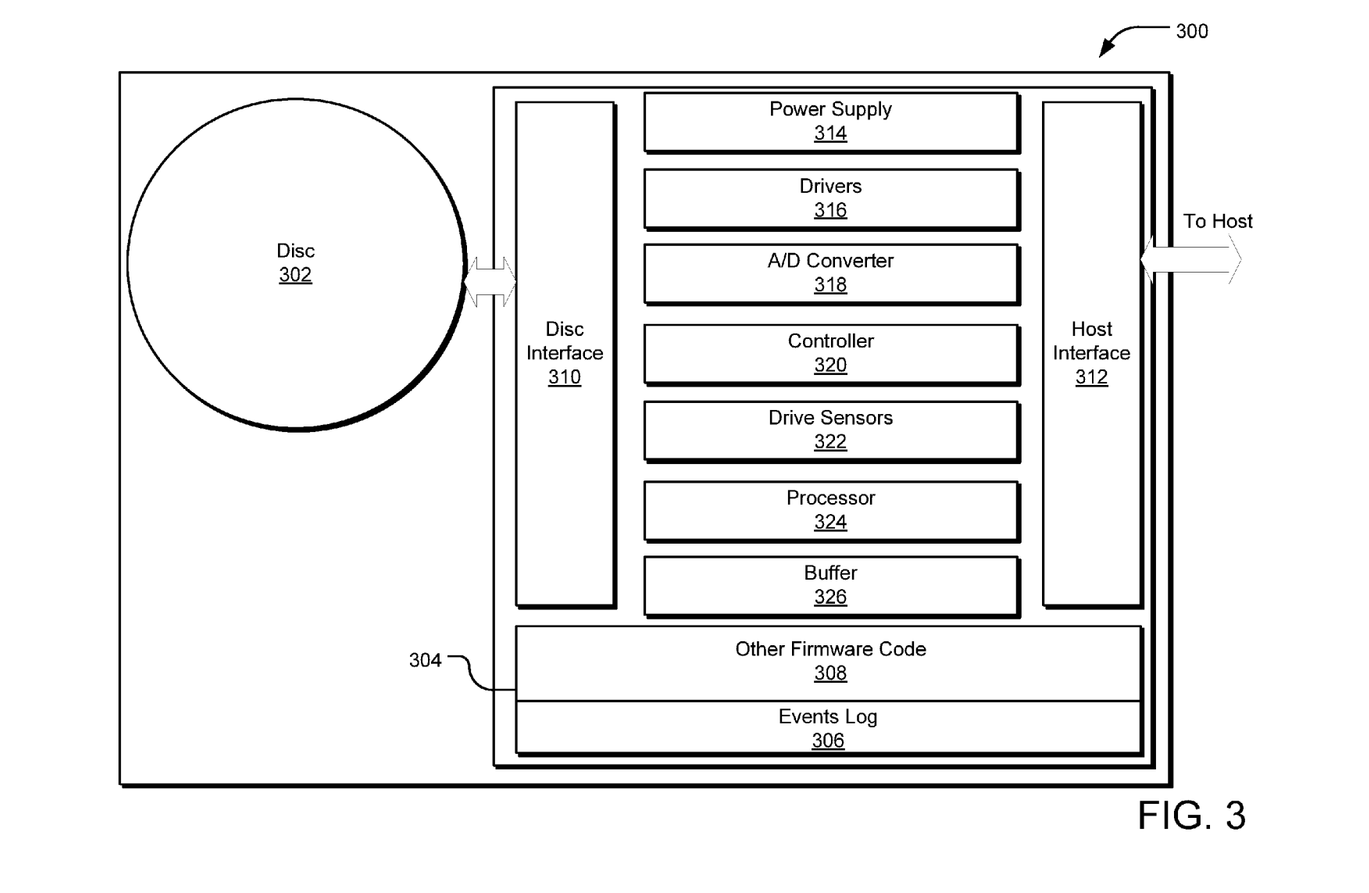
FIG. 3 illustrates an example storage device having autonomous event logging capability.

FIG. 3 illustrates an example storage device 300 having autonomous event logging capability. In one implementation, the storage device 300 includes a disc 302 and firmware 304. Information is read from and written to the disc 302 using a read/write head. The disc 302 has sectors for storing data, such as event entries, and may embody optical, solid state, magnetic, and/or other storage. In one implementation, the disc 302 includes an events log having a plurality of sequential sectors.

In one implementation, the firmware 304 is flash, which includes an events log 306 and other firmware code 308. The events log 306 stores event-based diagnostic data as event entries recorded in real time as events are identified. The other firmware 308 may store instructions for controlling the storage device 300 including but not limited to instructions for event-based diagnostic data identification, recording, and retrieval. In one implementation, the firmware 308 is approximately 1 MB and the events log 306 is approximately 4 KB of memory such as flash memory, which stores event entries that are each approximately 32 bytes. Additionally, the other firmware 308 may store instructions for executing commands received from the disc 302 via a disc interface 310 or from a host (not shown) via a host interface 312. The host interface 312 may be, for example, a Small Computer System Interface (SCSI), a Fibre Channel interface, a Serial Attached SCSI (SAS), or a Serial Advanced Technology Attachment (SATA). However, event detection, identifying, recording, and retrieving operations stored in the firmware 304 are interface-independent, and as such, other interfaces are contemplated.

From power on (e.g., at boot) storage device 300 to power off, the storage device 300 self-monitors its environmental conditions to evaluate its performance and records any detected events to the events log 306. In one implementation, the storage device 300 includes a power supply 314, drivers 316, an Analog-to-Digital (A/D) converter 318, a controller 320, driver sensors 322, a processor 324, and buffer 326 for detecting, identifying, and recording events.

The processor 324 may be a central processing unit (CPU), microprocessor, or other processing unit. The processor 324 controls the operations of the storage device 300, for example, by executing instructions stored in the firmware 304 and/or on the disc 302 or according to command received through the host interface 312 and/or the disc interface 310.

The power supply 314 supplies directed current (DC) power to components in the storage device 300. The power supply 314 converts general-purpose alternating current (AC) electric power from an external source to low-voltage DC power. The A/D converter 318 measures analog signals and converts the signals to a discrete time digital representation for storing in the event log. The A/D converter 318 may measure power levels from the power supply 314 and convert the information for storage in the event log as diagnostic data. For example, a surge in power outside tolerance levels may shock components in the storage device 300 causing damage. Such a surge may be due to customer mishandling or indicate an event not covered by warranty.

The drive sensors 322 measure environmental conditions of the storage device 300 including but not limited to temperatures, voltage, current, acceleration of the disc 302, and other parameters affecting the performance of the storage device 300. The drive sensors 322 may further compare the monitored environmental conditions to defined thresholds to determine whether the storage device 300 is operating within tolerance.

Additionally, the other firmware 308 may detect and identify other errors or performance anomalies, including but not limited to events regarding the disc interface 310, the host interface 312, and events that cause a problem for the host. The event monitoring and identification is focused on events that correlate to system level failures of the storage device 300 as opposed to events such as retries, alts, etc. The other firmware 308 further distinguishes between events resulting from the performance of the storage device 300 and events resulting from the performance of the host and/or the host interface 312.

The storage device 300 autonomously (i.e., without a command from the host or the host interface 312) detects and identifies events under the direction of the other firmware 308. If the other firmware 308 identifies an event regarding the performance of the storage device 300, the event-based diagnostic data for each detected event is recorded to in substantially real time as an event entry.

In one implementation, the event-based diagnostic data is recorded to buffer 326 upon the detection and identification of an event. The buffer 326 temporarily stores the event-based diagnostic data in memory while the other firmware 308 analyzes the operational parameters of the storage device 300 and the nature of the event. The firmware 308 determines whether to store the event-based diagnostic data to the disc 302 or the events log 306.

The storage device 300 records event entries autonomously. Accordingly, the storage device 300 is configured to identify event-based diagnostic data and record event entries even if the host interface 312 is inoperative. Event entries may be recorded to the disc 302 or to the events log 306 depending on the operational parameters of the storage device 300. The drivers 316 assist the other firmware 308 in recording event entries, and the drivers 316 include protocol regarding whether to store event entries to the events log 306 or disc 302. For example, if the disc 302 is not writable, fails to spin up, or otherwise fails to function, the storage device 300 may write an event entry to the events log 306. Further, to ensure that event-based diagnostic data is not lost, event entries may be recorded to the events log 306 from power on of the storage device 300 to power off.

When the other firmware 306 and the drivers 316 select the disc 302 as the location for recording an event entry, the controller 320 controls the movement of the read/write head to write the event entry to the disc 302. Additionally, the controller 320 may store firmware and/or configuration setting for the storage device 300. In one implementation, data stored in the events log 306 is transferred to the disc 302 during updates to the firmware 304. Such firmware updates may erase any data stored on the events log 306. Accordingly, prior to an update, the other firmware 308 reads the data from the events log 306 and directs the controller 320 to write the data to the disc 302 via the disc interface 310. Subsequently, the firmware 304 is erased and updated. After the update, the other firmware 308 rewrites the events entries from the disc 302 to the events log 306.

In one implementation, each event entry includes an error code, raw data, a universal time stamp, and LBA, if applicable. The error code includes data including an event group, which identifies the type of event, a failure code, which identifies the detected failures, and data indicating whether the event was fatal. For example, the event groups may include system interface events, process related events, servo related events, firmware or hardware related events, error recovery events, DST failure events, log failure events, DOS failure events, environmental or handling events, and firmware debug events. The failure codes may include, for example, excessive disc slip, voltage outside threshold, temperature outside threshold, disc spin up failure, excessive command completion time, etc.

The raw data includes additional data that is relevant to the event including without limitation measurements corresponding to the performance of the storage device 300 and measurements indicating customer mishandling of the storage device 300. Such measurements may include, for example, power level, temperature, voltage, current, acceleration of the storage device media (e.g., a disc), measured disc slip, and indications of water damage.

The error code and raw data are linked with the universal time stamp, which is the time of the event occurrence measured from the power on or boot of the storage device 300. In one implementation, where the storage device 300 has experienced a failure resulting in the media in the storage device 300 not being writable or a failure rendering the host interface 312 inoperative, the time stamp is recorded as a blank placeholder. If such failures are subsequently remedied, the firmware 304 updates the placeholder time stamp with the actual time of the failure event. If such failures are not subsequently remedied, an approximate time of failure may be determined based on the time stamps of events previously recorded to the event log.

The event-based diagnostic data recorded may further include Logical Block Addressing (LBA), which specifies the location of data stored in the storage device 300 and one or more internal error codes, which include data specifying errors that occurred during event logging operations. For example, internal error codes may include, without limitation, invalid LBA, and invalid time stamp, and truncated raw data.

In response to a request received from the host to retrieve information from the events log 306, the firmware 304 outputs a diagnostics log via the host interface 312 or a serial port. In one implementation, the firmware 304 interprets and parses the event entries in the event log into an event log summary, outputted as the diagnostics log. In another implementation, an external device interprets and parses the event entries in an event log summary. The event entries in the event log summary may be further organized according to the event groups. The event groups may have privacy, proprietary, or other restrictive viewing settings to allow only certain users to view data in an event group. The diagnostics log may be used for failure analysis, warranty analysis, integrator analysis, troubleshooting analysis, or other analyses regarding the performance of the storage device 300. For example, the diagnostics log may be used for failure analysis to determine whether the storage device 300 failed, when the storage device 300 failed, what the root cause of the failure was, and what the customer experienced at the time of the failure. Additionally, the diagnostics log including the summary may be used to make the failure analysis more effective and efficient by focusing the failure analysis to a specific point in time that a particular failure (e.g., a failure causing the problem a customer experienced) occurred. For example, the universal timestamp, correlated to an event, directs an in-depth failure analysis with substantially more data (e.g., data collected for storage device logs or test systems) to a specific point in the data that relates to a particular failure. Additionally, the event log summary may be used to trigger further failure analysis for a particular failure based on the history logs of the storage device 300.

Figure 4:
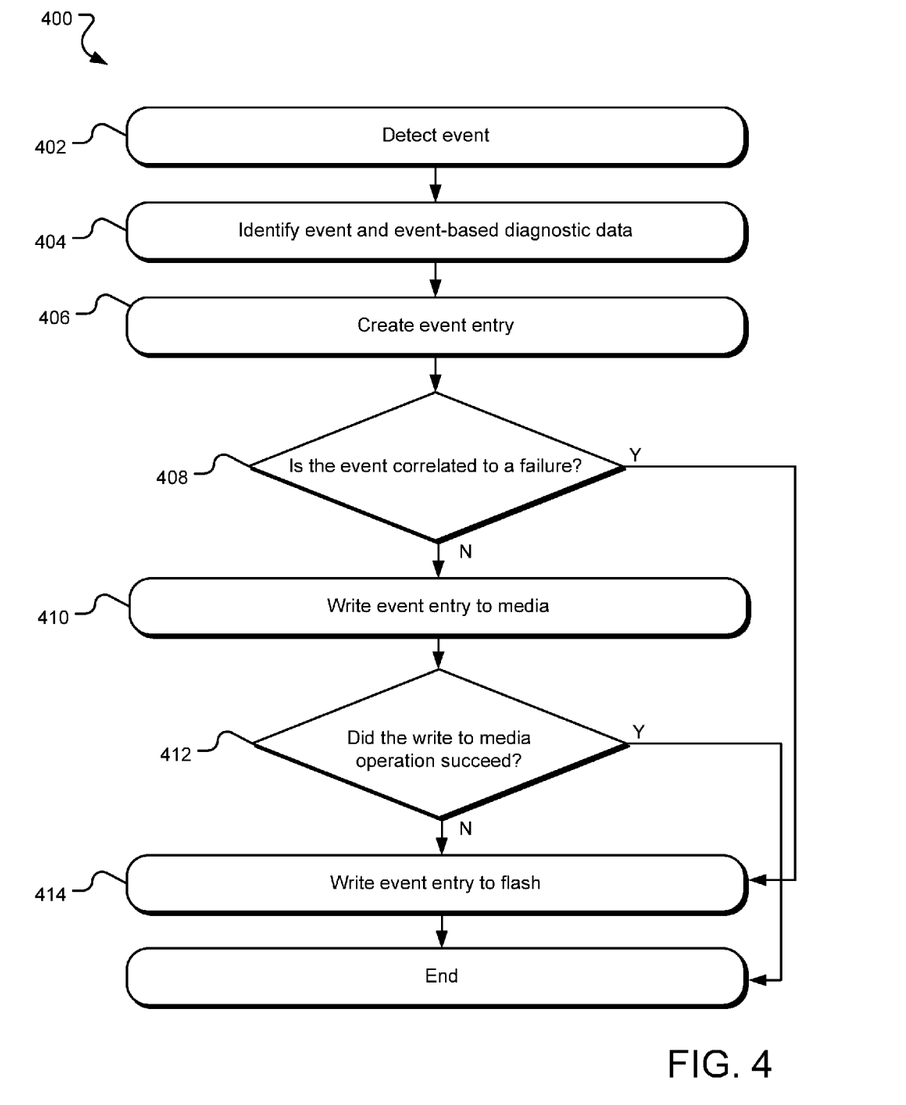
FIG. 4 illustrates example operations for identifying and logging events.

FIG. 4 illustrates example operations 400 for identifying and logging events. A detecting operation 402 detects an event (e.g., storage device failure or error) corresponding to the performance of the storage device.

In one implementation, the detecting operation 402 monitors the environmental conditions and evaluates the performance of the storage device. For example, the detecting operation 402 monitors environmental conditions including but not limited to power levels, temperatures, voltage, current, acceleration of the storage device media (e.g., a disc), and other parameters affecting the performance of the storage device. The detecting operation 402 may compare the monitored environmental conditions to defined thresholds to determine whether the storage device is operating within tolerance. Additionally, the detecting operation 402 may detect other errors or performance anomalies, including but not limited to events regarding an interface of the storage device and events that cause a problem for a host to which the storage device is connected. The detecting operation 402 focuses the event monitoring and detection on events that correlate to system level failures of the storage device and events resulting from the performance of the storage device.

An identifying operation 404 autonomously (i.e., without a command from a host or interface) identifies an event detected during the detecting operation 402 and event-based diagnostic data corresponding to the detected event. The identifying operation 404 specifies the name of the detected event, a description of the event, and any additional diagnostic data relevant to the event, such as environmental conditions or performance anomalies of the storage device.

A creating operation 406 creates an event entry, including the event-based diagnostic data, for recording in an events log. The creating operation 406 builds the event entry in substantially real time as the event occurs. In one implementation, the event-based diagnostic data includes an error code, raw data, and a universal time stamp. The error code includes data including an event group, which identifies the type of event, a failure code, which identifies the detected failures, and data indicating whether the event was fatal. The raw data includes additional data that is relevant to the event including without limitation measurements corresponding to the performance of the storage device (e.g., detected environmental conditions) and measurements indicating customer mishandling of the storage device. The error code and raw data are linked with the universal time stamp, which is the time of the event occurrence measured from the power on or boot of the storage device. The creating operation 406 may further include, in the event entry, Logical Block Addressing (LBA), which specifies the location of data stored in the storage device and one or more internal error codes, which include data specifying errors that occurred during event logging operations.

A decision operation 410 specifies whether the event entry created during the creating operation 406 should be recorded to the media or the flash of the storage device based on the nature of the event. In one implementation, the decision operation 410 analyzes the event-based diagnostic data to determine whether the event is relevant to the root cause of a failure (e.g., the storage device is not operational through the host interface, etc.). If the event is not substantially correlated to a failure or is merely informational in nature, a writing operation 410 writes the event entry autonomously in substantially real time to an event log on the media. If the event is correlated to a failure, a writing operation 414 writes the event entry autonomously in substantially real time to an event log on the flash.

A decision operation 412 specifies whether the event entry created during the creating operation 406 will be recorded to the flash based on whether the writing operation 410 was successful. In one implementation, the decision operation 412 analyzes the operational parameters of the storage device, for example, to determine whether the media is writable or otherwise unavailable (e.g., the media fails to spin up or fails to function). If the media is unavailable or the writing operation 410 otherwise fails to record the event entry to the media, the writing operation 414 records the event entry to the flash with an indication that there was an error saving the event entry to the media. However, if the writing operation 410 successfully recorded the event entry to the media, the writing operation 414 may not record the event entry to the flash.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, unless explicitly claimed otherwise or a specific order is inherently necessitated by the claim language. Furthermore, one or more portions of the various processes disclosed above may be implemented by software, hardware, firmware or combination thereof.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A method comprising:
   autonomously detecting, via a storage device, an event regarding performance of the storage device; and
   autonomously recording event-based diagnostic data for the detected event to a storage medium the storage device in response to the autonomous detection, wherein the storage medium storing the event-based diagnostic data is separate from another storage medium of the storage device that stores user data.

2. The method of claim 1, wherein the event-based diagnostic data includes a timestamp.

3. The method of claim 2, wherein the event-based diagnostic data further includes an error code describing the detected event and raw data corresponding to performance of the storage device at the time of the detected event.

4. The method of claim 3, wherein the raw data includes monitored environmental conditions of the storage device.

5. The method of claim 1, wherein the event-based diagnostic data is recorded from power on of the storage device to power off.

6. The method of claim 1, further comprising:
   outputting a diagnostics log presenting the event-based diagnostic data.

7. The method of claim 1, wherein the storage medium storing the event-based diagnostic data is flash memory.

8. The method of claim 1, wherein the event-based diagnostics data is recorded in substantially real time.

9. A system comprising:
   a storage device with memory storing firmware instructions for autonomously detecting an event regarding performance of the storage device and autonomously recording event-based diagnostic data for the detected event to flash memory responsive to the autonomous detection; and
   a host device communicatively coupled to the storage device wherein the firmware instructions enable the storage device to autonomously record the event-based diagnostic data without receiving a command from the host device.

10. The system of claim 9, wherein the event-based diagnostic data further includes an error code describing the detected event and raw data corresponding to the performance of the storage device at the time of the detected event.

11. The system of claim 10, wherein the raw data includes monitored environmental conditions of the storage device.

12. The system of claim 9, wherein the detected event is a storage device detected event.

13. The system of claim 9, wherein the event-based diagnostic data is recorded from power on of the storage device to power off.

14. A tangible processor-readable storage medium encoding a processor executable program for executing a process, the process comprising:
   autonomously detecting, via a storage device, an event regarding performance of the storage device; and
   autonomously recording event-based diagnostic data for the detected event to memory in the storage device responsive to the autonomous detection without receiving a command from a communicatively coupled host device.

15. The tangible processor-readable storage medium of claim 13, wherein the event-based diagnostic data includes a timestamp.

16. The tangible processor-readable storage medium of claim 14, wherein the event-based diagnostic data further includes an error code describing the storage device detected event and raw data corresponding to the performance of the storage device at the time of the detected event.

17. The tangible processor-readable storage medium of claim 15, wherein the raw data includes monitored environmental conditions of the storage device.

18. The tangible processor-readable storage medium of claim 14, wherein the event-based diagnostic data is recorded from power on of the storage device to power off.

19. The method of claim 1, wherein the storage device performs the recording operation without receiving a command from a host, and without receiving a command from an interface.

* * * * *